(12) United States Patent
Wildermuth

(10) Patent No.: US 8,458,218 B2
(45) Date of Patent: Jun. 4, 2013

(54) INCREMENTAL DATA TRANSFER IN A DATABASE MANAGEMENT SYSTEM

(75) Inventor: Elton Philip Wildermuth, Oakland, CA (US)

(73) Assignee: Sybase, Inc., Dublin, CA (US)

( * ) Notice: Subject to any disclaimer, the term of this patent is extended or adjusted under 35 U.S.C. 154(b) by 190 days.

(21) Appl. No.: 12/880,263

(22) Filed: Sep. 13, 2010

(65) Prior Publication Data

US 2012/0066263 A1 Mar. 15, 2012

(51) Int. Cl.
G06F 7/00 (2006.01)
G06F 17/30 (2006.01)

(52) U.S. Cl.
USPC .......................................... 707/792; 707/825

(58) Field of Classification Search
USPC .................................. 707/791, 792, 802, 825
See application file for complete search history.

(56) References Cited

U.S. PATENT DOCUMENTS

| | | | | |
|---|---|---|---|---|
| 5,873,102 | A | * | 2/1999 | Bridge et al. ................. 707/640 |
| 6,012,063 | A | * | 1/2000 | Bodnar ......................... 707/697 |
| 6,366,917 | B1 | * | 4/2002 | St. John Herbert, III ............. 1/1 |
| 6,741,997 | B1 | * | 5/2004 | Liu et al. ............................... 1/1 |

OTHER PUBLICATIONS

William S. Keezer, Array-driven simulation of real databases, 1998, IEEE, vol. 2, 1461-1468.*
"Sybase Adaptive Server® Enterprise Data Transfer Utility", last revised Apr. 8, 2010, Sybase, Inc., United States; 14 pages.

* cited by examiner

*Primary Examiner* — Jean B Fleurantin
(74) *Attorney, Agent, or Firm* — Sterne, Kessler, Goldstein & Fox PLLC

(57) ABSTRACT

System, method, computer program product embodiments and combinations and sub-combinations thereof for incremental data transfer in a database management system (DBMS) are provided. In an embodiment, a database table enabled for partial export from a database management system is identified. Data within the database table to be exported is also identified, and the identified data is transferred in a chosen format from the database table to an export location.

33 Claims, 3 Drawing Sheets

INCREMENTAL DATA TRANSFER IN A DATABASE MANAGEMENT SYSTEM

BACKGROUND

1. Field of the Invention

The present invention relates to database management systems and, more particularly, to a system and methodology for incremental data transfer in a database management system.

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

As data volumes grow through the utilization of database systems, even simple tasks, such as exporting information, can become time-consuming and unwieldy. Such exporting occurs as a result of the manner in which many applications share information, often repeatedly. Selecting all data repeatedly from a given table and sending it to an outside receiver can potentially send huge volumes of data, most of which is not necessary, because it already exists at the receiving application. This slows down processing speed and requires a lot of work at the receiver. In many scenarios, just exporting only altered information is all that's necessary. This can result in a much smaller, more manageable data set.

In order to obtain better performance in a database system environment, what is needed is the ability to lessen the workload by providing a fast, efficient approach of data transfer through incremental data transfer. The present invention provides a solution for these and other needs.

BRIEF SUMMARY

Briefly stated, the invention includes system, method, computer program product embodiments and combinations and sub-combinations thereof for incremental data transfer in a database management system (DBMS). In an embodiment, a database table enabled for partial export from a database management system is identified. Data within the database table to be exported is also identified, and the identified data is transferred in a chosen format from the database table to an export location.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
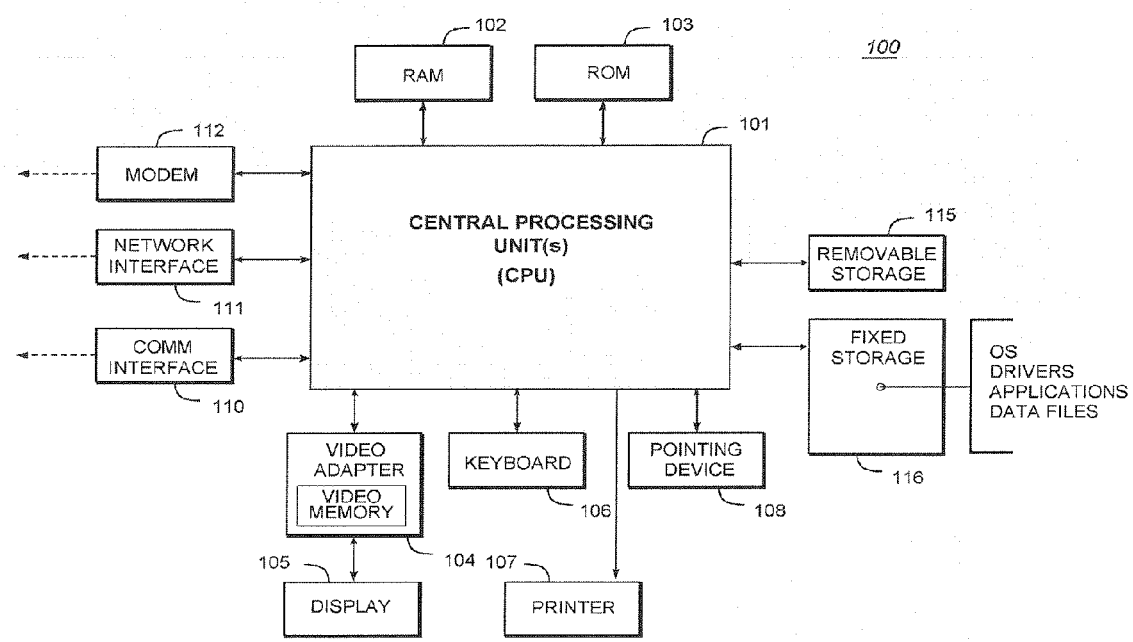
FIG. 1 illustrates a very general block diagram of a computer system in which software-implemented processes of the present invention may be embodied.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for incremental data transfer in a database management system.

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s)

(CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100 in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP Laserjet printer (available from Hewlett Packard of Palo Alto, Calif.) for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Figure 2:
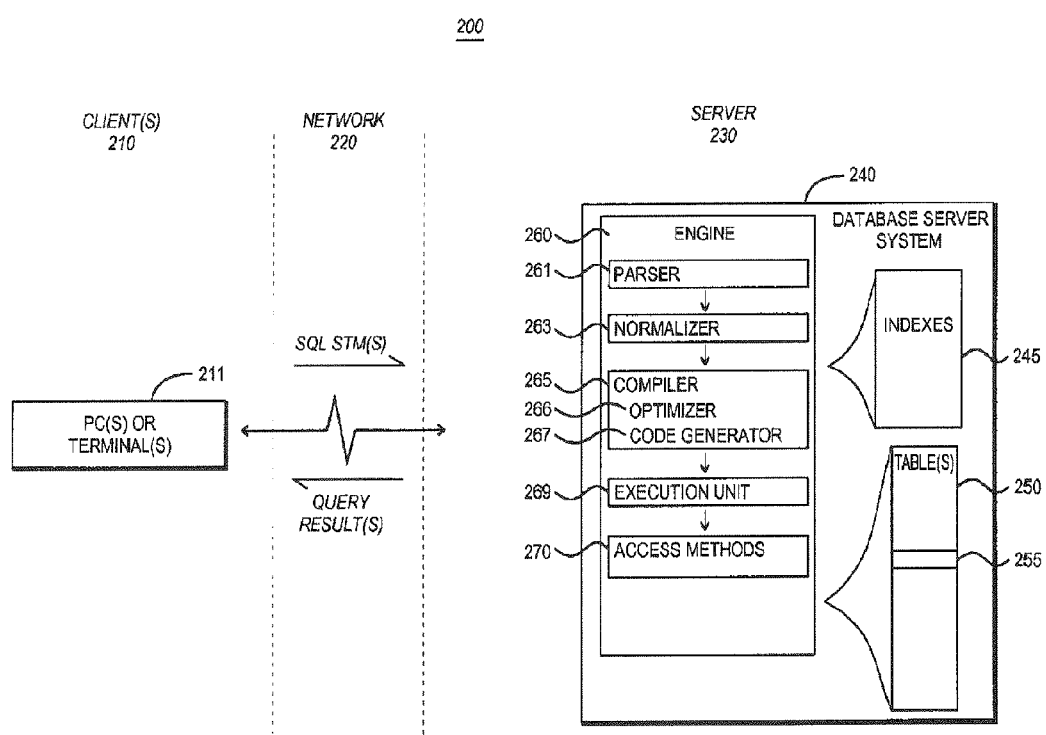
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (ASE, available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 15.5" documentation set from Sybase, Inc. of Dublin, Calif. This product documentation is available via the Internet (e.g., currently at sybooks.sybase.com/). The disclosures of the foregoing are hereby incorporated by reference.

The above-described computer hardware and software are presented for purposes of illustrating the basic underlying desktop and server computer components that may be employed for implementing the present invention. The present invention, however, is not limited to any particular environment or device configuration. Instead, the present invention may be implemented in any type of system architecture or processing environment capable of supporting the methodologies of the present invention presented in detail below.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool. I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. An additional consideration with respect to I/O is whether it is sequential or random. Due to the construction of hard disks, sequential I/O is much faster then random access I/O. Data structures and algorithms encouraging the use of sequential I/O can realize greater performance. In typical implementations, this can be done by using data structures and algorithms that maximize the use of pages that are known to reside in the cache or by being more selective about what pages are loaded into the cache in the first place.

Among the issues not addressed by current database management system solutions is the fact that these existing solutions are not designed to support extraction of data from a table in a way that is fast and functional, avoiding repeatedly selecting all data from a given table and sending it to an outside receiver, which potentially sends huge volumes of repetitive data. In order to obtain better performance in a database system environment, the embodiments of the present invention provide the ability to lessen the workload by providing a fast, efficient approach of data transfer through incremental data transfer.

Figure 3:
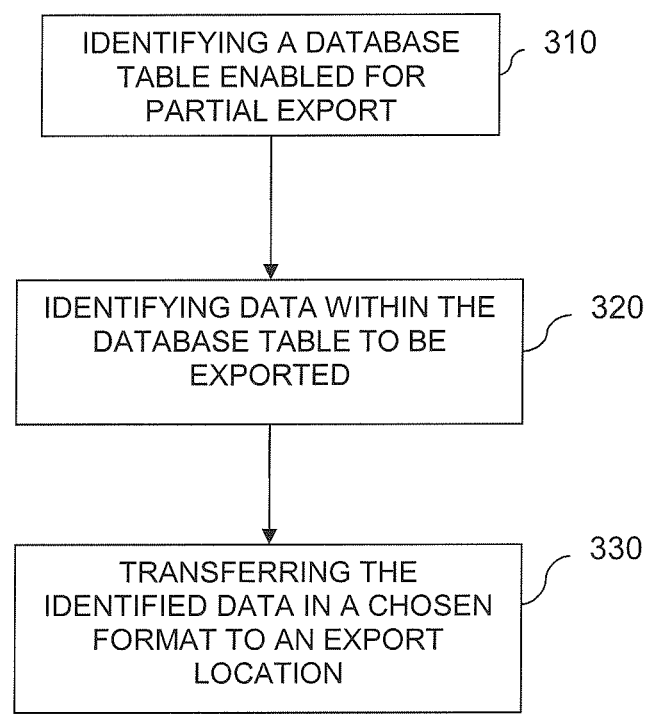
FIG. 3 illustrates a block diagram of an overall approach for incremental data transfer in accordance with embodiments of the invention.

Referring now to FIG. 3, a block flow diagram of a process of incremental data transfer in a DBMS is presented. As shown, the process includes identifying a database table enabled for partial export from a database management system (block 310). In an embodiment, each table planned for incremental transfer specification needs to be created or, if already created, modified for eligibility as a table for incremental transfer. As is generally understood, disk-resident databases are created using a command, such as for example, the CREATE DATABASE command in ASE, in which a series of named logical disk devices are listed, specifying the size to use on them as data devices, followed by naming a list of logical disk devices and their size for the transaction log. Database configuration on these devices can subsequently be altered using another command, such as an ALTER DATABASE command, to extend the database's data or log segments on different logical devices. By way of example, the CREATE and ALTER commands are extended to enable the incremental transfer property:

create table table_name ( . . . columns . . . ) with transfer table on or alter table table_name set transfer table on Once made eligible, preferably tables remain eligible until that option is specifically removed via 'alter table . . . set transfer table off'. While eligible, they can participate in incremental transfers and have a history of their transfers retained, as described below. Further, while table transfer can work even without enabling this property, it should be appreciated that in such an approach all rows are always transferred, and if a user updates the table while the transfer is in progress, the updated rows may not be transferred. Further, the transfer is not incremental, since the entire table is transferred, and later transfers are not correlated with the transfer.

Once the table is identified, the process continues with identifying data within the database table to be exported (block 320). In an embodiment, only the rows that have changed or been inserted since a previous transfer, and only 'committed' data (that is, data whose updating transaction has committed at the time the transfer starts) are identified for transfer.

Providing such 'incremental' transfer requires a way of knowing what data has already been sent and what hasn't been sent since data was inserted or most recently changed. To accomplish this, a marker is used in the data, as well as a transfer history. In an embodiment, the marker is an 8-byte data marker in the data row and provides a sequence number in order to identify when this data row was most recently updated. Marking each row when a transaction begins in a given database establishes a low and high boundary of data that may be sent during a given transfer. Having these data markers or "timestamps" ensures a table is 'eligible' for incremental transfer and every row in an eligible table has this marker. Thus, rows in eligible tables are larger than rows in otherwise identical ineligible tables, so an eligible table requires more space in the database. When altering a table with respect to its eligibility for incremental transfer, a change to the row size results (as a result of either adding or removing the data markers), which causes a complete reallocation of the table, just as it would when altering the table by adding or removing a column, as is well understood in the art.

For the transfer history, a table, e.g., spt_TableTransfer, is used in each database containing eligible tables. It contains information about past transfers of eligible tables. Creation of it, once in each database, occurs such as by using a designated procedure, e.g., sp_setup_transfer_table. Configuring the length of the retained history controls the number of succeeding and failing transfers remembered for each eligible table. This aids in troubleshooting and recovery, since the history can tell which transfers succeeded, which failed, and why they failed. Also, if something happens later to damage the output data, the history entries can be used to establish a boundary for change timestamps, i.e., a selected history entry establishes a lower boundary for change timestamps such that all committed rows are selected for transfer that were sent during that transfer and/or were inserted or changed after that transfer. The data contained in the transfer history table can include a value showing the transfer's ending status, the object identifier of the transferred table, the transaction data marker at or above which rows were considered uncommitted and could not be transferred, the date and time at which the transfer began, the data and time at which the transfer ended, the number of rows sent during the transfer, the number of bytes written during the transfer, a number generated to track the transfer and provide a unique sequence for transfers of a table, a user-supplied tracking identifier if specified, and an output file name given in the transfer table command.

Configuration of a transfer history length suitably occurs once for an entire server, e.g., using sp_configure 'max transfer history' N, where 'N' is an integer (e.g., 1-255) and designates, for each eligible table, a history of as many as N successful transfers and N failing transfers. In addition, a transfer memory pool is configured once for the entire server, e.g., using sp_configure 'transfer utility memory size' Z, where 'Z' is a number of 'memory pages' (e.g., blocks of 2048 bytes, with a default of 4096 pages, or 8 megabytes, for example). The transfer memory pool is for use during normal runtime to describe the table and to track information about where changed data for each table is physically located in the database. It is also used during transfers to hold rows being written to or read from the file, as is well appreciated by those skilled in the art.

Further, during normal processing, the physical location of data changes is tracked. In an embodiment, each object to be transferred maintains a map showing where its data is stored. The fundamental element of that map is a data structure, e.g., an 8-byte packed data structure describing a group of 46 allocation units, with the high-ordered 18 bits containing an encoded allocation page identifier and the remaining 46 bits functioning as a bit mask. By way of reference, an allocation unit refers to a group of contiguous logical data pages (e.g., 256) as a basic unit of database storage management. The map is used to track which allocation units within a table contain rows that were changed since the last transfer. Within the map, a set bit suitably shows that the indicated allocation unit contains rows that have not yet been transferred. Storage of the map is included as part of the dictionary showing the table's complete storage area. The map provides the ability to go directly to the changed data instead of reading every row in the table.

Once the data is identified, it is transferred in a chosen format from the database table to an export location (block 330). For example, in the environment of ASE, a basic form of a command request for table transfer is:
    transfer table table_name to destination_file
When a transfer begins, it takes the lowest data marker currently registered for the table as its ceiling. If no transaction is registered, the default is the current database timestamp. Rows having a data marker at or above this ceiling are considered uncommitted for the transfer and will not be sent. Of course, the ceiling of one transfer is the floor of the next, so that any row whose data marker is below that floor has already been sent. The first transfer of a table suitably uses a floor of zero, thus making every row eligible for transfer.

Options for this command can control its operation, describing how the data is formatted and controlling some aspects of the formatting, as well as controlling how the command behaves. By way of example, exported rows may be written to an output file for designated receivers such as, in the ASE environment, Sybase IQ, ASE, bulk copy (bcp), or character-encoded output by specifying options controlling basic formatting via a 'for' clause:
    transfer table table_name to destination_file for {ase|bcp|csv|iq}
With these options, 'for ase' selection results in data being written in ASE's internal file format, 'for bcp' results in data being written in bcp's binary data format, which produces an associated format file, placed in the same directory as the output data, named '{table_name},{dbid},{object_id}.fmt', 'for csv' writes character-coded output in user definable column and row separators, and 'for iq' writes data in Sybase IQ's binary format, similar to sending the result of an IQ select statement out to a file in binary form.

The 'transfer table' command writes data to a file on the same system where the DBMS is currently running. In a multi-engine server, the file exists on a file system visible to the engine that services the command. The transfer opens the file when the transfer begins and closes it when the transfer ends. Under certain circumstances, such as when a transfer fails for any reason, the file is deleted as it is closed. This may also occur when a transfer opens the file but finishes without writing any data to the file, e.g., when identified in advance that there is no data available to send since tracking information shows that no data in the table has been modified since the last successful transfer, or when the data has been modified, but all of the changes are uncommitted and thus cannot be sent by this transfer.

If something happens after transfer out to a file is complete but before the file is loaded to its intended receiver, a resend of the data avoids loss of any updates made, such as by directing that the floor timestamp from a history entry in spt_TableTransfer be taken. While it is not possible to resend exactly the same data sent by a prior transfer, i.e., subsequent updates may have changed the data, so those rows may no longer exist, a 'resend' of a transfer is starting a transfer that behaves as though that transfer and any subsequent transfers never happened.

By way of example:
    transfer table table_name to destination_file with resend=NNN can be used to initiate a resend, where the value NNN is a sequence ID as stored in spt_TableTransfer, specified as a positive, non-zero integer, or as a negative integer. Positive integers are sequence IDs from spt_TableTransfer.sequence id, obtainable by selection from spt_TableTransfer, for example:
    select sequence_id from spt_TableTransfer where pathname like '% file_name %'
When a sequence_id is provided that does not exist, a resend of all data in the table is considered to be the desired action, and the transfer is treated as though it were the first transfer ever done for this table. The other way to designate sequence_id is as a negative integer. Here, a previous successful transfer is located by its relative position in spt_TableTransfer, for example, a −1 is the most recent successful transfer, −2 the next most recent, and so on. When exceeding the count, e.g., if the history has only 5 successful transfers and 'transfer table . . . with resend=−6' is executed, this transfer is treated as the first-ever transfer of this table.

While a transfer is in progress, statistical information about that transfer is kept in memory, including the amount of data transferred so far and estimates of how much more data the transfer expects to send. That information is available in real time through a monitoring table, e.g., monTableTransfer. This includes all transfers, whether or not the table being transferred is eligible for incremental transfer. This table also contains historical information about transfers of tables for which the DBMS currently stores information in memory. For the eligible, it also can extract and report historical information from spt_TableTransfer while the table's information is available in memory. Data contained in the monitoring table can include the database identifier, the table identifier, the table name, a tracking sequence identifier, a user-provided identifier if specified, an approximate percentage of total work done, a date and time at which the transfer began, a data and time at which the transfer ended, the transfer's ending status, the transfer floor value, the transfer ceiling value, the number of rows sent, and the number of bytes sent.

Another option for the transfer table command, e.g., 'sync', can be included to designate whether this transfer does or does not synchronize with current transactions. When true, a transfer may not begin against a table until all currently open transactions that modify that table have ended, so the transfer will wait until the table has no transactions open against it. While a transfer is waiting to begin, no transaction may change the affected table unless that transaction has already changed that table, and after the transfer begins, transactions may change the table, but they may only change pages that the transfer has already inspected. This can slow down transaction processing, but assures that the transfer includes only transactionally consistent data. When false, transfer works independently of transactions. The transfer will include only committed data, but the output file is not guaranteed to contain every row affected by a particular transaction. Transmitting committed data without considering transactional consistency is the default action, since it is assumed that a current transfer will be followed by another transfer.

Transfers of separate tables may happen substantially simultaneously. The number of simultaneous transfers is limited only by the number of files the operating system permits the DBMS to open simultaneously. Each ongoing transfer uses one file, where the reference to "file" includes a network connection suitable for transferring data between computers, a "named pipe" suitable for transferring data directly into another computer program without involving an intervening file, and the like.

By way of example, the following describes use of the transfer command to transfer data to an external file, change the data in the table, and then again use the transfer command to repopulate the table from this external file, showing that transfer appends the data to the file, and doesn't overwrite it in the environment of ASE. For ease of explanation, this example transfers data out and then in to the same table. In a typical user scenario, it is expected that data would be transferred out of one table and then in to another.

Run sp_setup_table_transfer to create the spt_TableTransfer table, which stores transfer history:

sp_setup_table_transfer

Configure max transfer history. With a default of 10, 10 successful and 10 unsuccessful transfers are retained for each table marked for incremental transfer. This example changes the value of max transfer history from 10 to 5:

sp_configure 'max transfer history', 5

Create the transfer_example table, which has the transfer attribute enabled and uses datarow locking:

```
create table transfer_example (
    f1 int,
    f2 varchar(30),
    f3 bigdatetime,
    primary key (f1)
) lock datarows
    with transfer table on
```

To populate the transfer_example table with sample data:

```
set nocount on
declare @i int, @vc varchar(1024), @bdt bigdatetime
select @i = 1
while @i <= 10
begin
    select @vc = replicate(char(64 + @i), 3 * @i)
    select @bdt = current_bigdatetime( )
    insert into transfer_example values ( @i, @vc, @bdt )
    select @i = @i + 1
end
set nocount off
```

Selecting all data from the table, e.g.,:
select*from transfer_example
order by f1
results in:

| f1 | f2 | f3 |
|---|---|---|
| 1 | AAA | Jul 17 2009 4:40:14.465789PM |
| 2 | BBBBBB | Jul 17 2009 4:40:14.488003PM |
| 3 | CCCCCCCCC | Jul 17 2009 4:40:14.511749PM |
| 4 | DDDDDDDDDDDD | Jul 17 2009 4:40:14.536653PM |
| 5 | EEEEEEEEEEEEEEE | Jul 17 2009 4:40:14.559480PM |
| 6 | FFFFFFFFFFFFFFFFFF | Jul 17 2009 4:40:14.583400PM |
| 7 | GGGGGGGGGGGGGGGGGGGGG | Jul 17 2009 4:40:14.607196PM |
| 8 | HHHHHHHHHHHHHHHHHHHHHHHH | Jul 17 2009 4:40:14.632152PM |
| 9 | IIIIIIIIIIIIIIIIIIIIIIIIIII | Jul 17 2009 4:40:14.655184PM |
| 10 | JJJJJJJJJJJJJJJJJJJJJJJJJJJJJJ | Jul 17 2009 4:40:14.678938PM |

The example continues with a transfer of the transfer_example data to an external file using the for ASE format:

transfer table transfer_example to 'transfer_example-data.ase' for ase (10 rows affected)

The data transfer creates a history record in spt_TableTransfer, the data of which is checked via select id, sequence_id, end_code, ts_floor, ts_ceiling, row_count
from spt_TableTransfer
where id=object_id('transfer_example')

resulting in an output of

| id | sequence_id | end_code | ts_floor | ts_ceiling | row_count |
|---|---|---|---|---|---|
| 592002109 | 1 | 0 | 0 | 5309 | 10 |

Disabling the transfer attribute from transfer_example demonstrates that the receiving table doesn't need the transfer attribute enabled to receive incremental data (where the database has 'select into' enabled before running alter table).

alter table transfer_example
set transfer table off

After the alter table command runs, spt_TableTransfer is empty, as checked by:

select id, sequence_id, end_code, ts_floor, ts_ceiling, row_count
from spt_TableTransfer
where id=object_id('transfer_example')
resulting in:

| id | sequence_id | end_code | ts_floor | ts_ceiling | row_count |
|---|---|---|---|---|---|

(0 rows affected)

By updating transfer_example to set its character data to no data and to specify a date and time in its bigdatetime column, it can be verified that the table does not contain the original data:

update transfer_example
set f2='no data',
f3='Jan. 1, 1900 12:00:00.000001AM'
(10 rows affected)

After the update, transfer_example is selected via:
select*from transfer_example
order by f1
This results in:

| f1 | f2 | f3 |
|---|---|---|
| 1 | no data | Jan 1 1900 12:00:00.000001AM |
| 2 | no data | Jan 1 1900 12:00:00.000001AM |
| 3 | no data | Jan 1 1900 12:00:00.000001AM |
| 4 | no data | Jan 1 1900 12:00:00.000001AM |
| 5 | no data | Jan 1 1900 12:00:00.000001AM |
| 6 | no data | Jan 1 1900 12:00:00.000001AM |
| 7 | no data | Jan 1 1900 12:00:00.000001AM |
| 8 | no data | Jan 1 1900 12:00:00.000001AM |
| 9 | no data | Jan 1 1900 12:00:00.000001AM |
| 10 | no data | Jan 1 1900 12:00:00.000001AM |

(10 rows affected)

Transferring the example data from the external file into transfer_example illustrates that even though transfer_example is no longer marked for incremental transfer, it can transfer data into the table. Because it has a unique primary index, the incoming rows replace the existing data and do not create duplicate key errors:

transfer table transfer_example
from 'transfer_example-data.ase'
for ase
(10 rows affected)

Selecting all data from transfer_example verifies that the incoming data replaced the changed data:

select*from transfer_example
order by f1
This results in:

| f1 | f2 | f3 |
|---|---|---|
| 1 | AAA | Jul 17 2009 4:40:14.465789PM |
| 2 | BBBBBB | Jul 17 2009 4:40:14.488003PM |
| 3 | CCCCCCCCC | Jul 17 2009 4:40:14.511749PM |
| 4 | DDDDDDDDDDD | Jul 17 2009 4:40:14.536653PM |
| 5 | EEEEEEEEEEEEEE | Jul 17 2009 4:40:14.559480PM |
| 6 | FFFFFFFFFFFFFFFFF | Jul 17 2009 4:40:14.583400PM |
| 7 | GGGGGGGGGGGGGGGGGGGGG | Jul 17 2009 4:40:14.607196PM |
| 8 | HHHHHHHHHHHHHHHHHHHHHHHH | Jul 17 2009 4:40:14.632152PM |
| 9 | IIIIIIIIIIIIIIIIIIIIIIIIIII | Jul 17 2009 4:40:14.655184PM |
| 10 | JJJJJJJJJJJJJJJJJJJJJJJJJJJJJJ | Jul 17 2009 4:40:14.678938PM |

Reenabling transfer for transfer_example allows subsequent transfers to use the previous parameters by default.

alter table transfer_example
set transfer table on
(10 rows affected)

As demonstrated by these examples, operations in accordance with the embodiments of the invention successfully provide a straightforward and versatile mechanism for incremental data transfer. Further, the utility can format its output data in one of several forms, suitable for a variety of receivers. It offers a configurable history mechanism for remembering the results of previous transfers, applying previous command options as the defaults for the current transfer. A monitoring table allows users to track the progress of ongoing transfers as they occur. Furthermore, eligible tables are read without typical locking overhead, and other operations are able to proceed normally.

Additionally, testing has shown that the utility transfers data out from tables at between four and five times the speed of a 'bcp out' command. For example, a measurement of data extraction speed for 'transfer table . . . for bcp' versus single-threaded bcp out resulted in bcp out averaging about 17,000 rows per second while transfer table averaged about 75,000 rows per second. Further, using a single in-memory database in ASE on a Linux (AMD 64-bit) machine, throughput was measured on five tables simultaneously using 'bcp in' to add data to the tables while 'transfer table' was extracting data from them. In these tests, it was found that bcp in inserted data at 91-110 Gb per hour, transfer table extracted data at 107-145 Gb per hour, and total I/O throughput was 198-255 Gb per hour. Such improved performance from incremental table transfer is expected to be especially relevant in the context of environments using in-memory databases.

While the invention is described in some detail with specific reference to a preferred embodiment and certain alternatives, there is no intent to limit the invention to that particular embodiment or those specific alternatives. Further, the description presents methods that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). Those skilled in the art will appreciate that modifications may be made to the preferred embodiment without departing from the teachings of the present invention.

What is claimed is:

1. A method for incremental data transfer in a database management system (DBMS), the method comprising:
   identifying, by one or more computing devices, a database table enabled for partial export from a database management system;
   identifying, by the one or more computing devices, partial data within the database table to be exported, wherein the partial data is less than fall data within the database table, and wherein identifying the partial data further comprises scanning for updated data and determining whether a level of transactional consistency is met for the data to manage when the data is transferred; and
   transferring, by the one or more computing devices, the identified partial data in a chosen format from the database table to an export location.

2. The method of claim 1, wherein identifying a database table further comprises identifying a table name in a command requesting table transfer.

3. The method of claim 2, wherein the table name corresponds with a table name of a table created as an eligible table for table transfer.

4. The method of claim 2, further comprising:
   identifying the chosen output format from the command.

5. The method of claim 1, wherein the updated data further comprises rows that have been inserted or changed in the database table relative to a previous transfer.

6. The method of claim 1, further comprising:
   annotating rows in the database table to allow tracking of status of the updated data.

7. The method of claim 1, wherein scanning further comprises scanning a data dictionary marking locations of the updated data in the database table.

8. The method of claim 7, further comprising:
   maintaining the change location data dictionary to indicate where changed data resides.

9. The method of claim 1, further comprising:
   retaining a history of transfer of the database table.

10. The method of claim 9, further comprising:
    selecting data for transfer based on information read from the history.

11. The method of claim 1, further comprising:
    controlling modification of table data by a transaction based upon table locations to be changed by the transaction during an on-going transfer.

12. The method of claim 1, wherein the transferred data provides incremental data for importing into another database table as replacement of existing data or insertion as new data.

13. The method of claim 12, further comprising:
    identifying existing data for replacement by the imported incremental data according to a selected index.

14. A computer-readable storage device having instructions stored thereon, execution of which, by a computing device, causes the computing device to perform operations for incremental data transfer in a database management system (DBMS), the operations comprising:
    identifying a database table enabled for partial export from a database management system;
    identifying partial data within the database table to be exported, wherein the partial data is less than full data within the database table, and wherein identifying the partial data further comprises scanning for updated data and determining whether a level of transactional consistency is met for the data to manage when the data is transferred; and
    transferring the identified partial data in a chosen format from the database table to an export location.

15. The computer-readable storage device of claim 14, wherein the updated data further comprises rows that have been inserted or changed in the database table relative to a previous transfer.

16. The computer-readable storage device of claim 14, further comprising:
    annotating rows in the database table to allow tracking of status of the updated data.

17. The computer-readable storage device of claim 14, wherein scanning further comprises scanning a data dictionary marking locations of the updated data in the database table.

18. The computer-readable storage device of claim 14, further comprising:
    controlling modification of table data by a transaction based upon table locations to be changed by the transaction during an on-going transfer.

19. The computer-readable storage device of claim 14, wherein the transferred data provides incremental data for importing into another database table as replacement of existing data or insertion as new data.

20. The computer-readable storage device of claim 19, further comprising:
    identifying existing data for replacement by the imported incremental data according to a selected index.

21. A system for incremental data transfer in a database management system (DBMS), the system comprising:
    storage for storing at least one database table; and
    a controller coupled to the storage and configured to identify a database table enabled for partial export, identify partial data within the database table to be exported, and transfer the identified partial data in a chosen format from the database table to an export location, wherein the partial data is less than full data within the database table and wherein identifying the partial data further comprises scanning for updated data and determining whether a level of transactional consistency is met for the data to manage when the data is transferred.

22. The system of claim 21, wherein identifying a database table further comprises identifying a table name in a command requesting table transfer.

23. The system of claim 22, wherein the table name corresponds with a table name of a table created as an eligible table for table transfer.

24. The system of claim 22, wherein the controller is further configured to identify the chosen output format from the command.

25. The system of claim 21, wherein the updated data further comprises rows that have been inserted or changed in the database table relative to a previous transfer.

26. The system of claim 21, wherein the controller is further configured to annotate rows in the database table to allow tracking of status of the updated data.

27. The system of claim 21, wherein scanning further comprises scanning a data dictionary marking locations of the updated data in the database table.

28. The system of claim 27, wherein the controller is further configured to maintain the change location data dictionary to indicate where changed data resides.

29. The system of claim 21, wherein the controller is further configured to retain a history of transfer of the database table.

30. The system of claim 29, wherein the controller is further configured to select data for transfer based on information read from the history.

31. The system of claim 21, wherein the controller is further configured to control modification of table data by a transaction based upon table locations to be changed by the transaction during an on-going transfer.

32. The system of claim 21, wherein the transferred data provides incremental data for importing into another database table as replacement of existing data or insertion as new data.

33. The system of claim 32, wherein the controller is further configured to identify existing data for replacement by the imported incremental data according to a selected index.

* * * * *